July 16, 1968   V. I. M. COX   3,392,816
METHOD OF AND APPARATUS FOR UNSCRAMBLING
ARTICLES IN BULK
Filed Nov. 23, 1966   3 Sheets-Sheet 2

INVENTOR

VICTOR IAN MALCOLM COX

By Cushman, Darby & Cushman
Attorneys

INVENTOR
VICTOR IAN MALCOLM COX

United States Patent Office 3,392,816
Patented July 16, 1968

3,392,816
METHOD OF AND APPARATUS FOR UN-
SCRAMBLING ARTICLES IN BULK
Victor Ian Malcolm Cox, Woodford Wells, Essex, England, assignor to Albro Fillers and Engineering Company Limited, Ponders End, Middlesex, England
Filed Nov. 23, 1966, Ser. No. 596,512
Claims priority, application Great Britain, Nov. 23, 1965, 49,738/65; May 12, 1966, 21,202/66
6 Claims. (Cl. 198—33)

ABSTRACT OF THE DISCLOSURE

An apparatus for unscrambling caps in bulk, such as the caps of bottles, jars, cans or other containers, in which the scrambled caps, preferably delivered onto a rotating platform and centrifuged thereon, are delivered into a guideway all flat and in random order as to whether one way up or the other, and divided off into separate streams at a selection zone so that at least one stream is produced with the caps all in the same orientation, i.e., either upright or inverted. Continuously operating air jet means preferably produce the separation at the selection zone by a cap-impelling jet or jets acting on the inside of caps appearing at the selection zone in one orientation but having a non-impelling action on the outside of the crowns of caps appearing in the opposite orientation.

Figure 1:
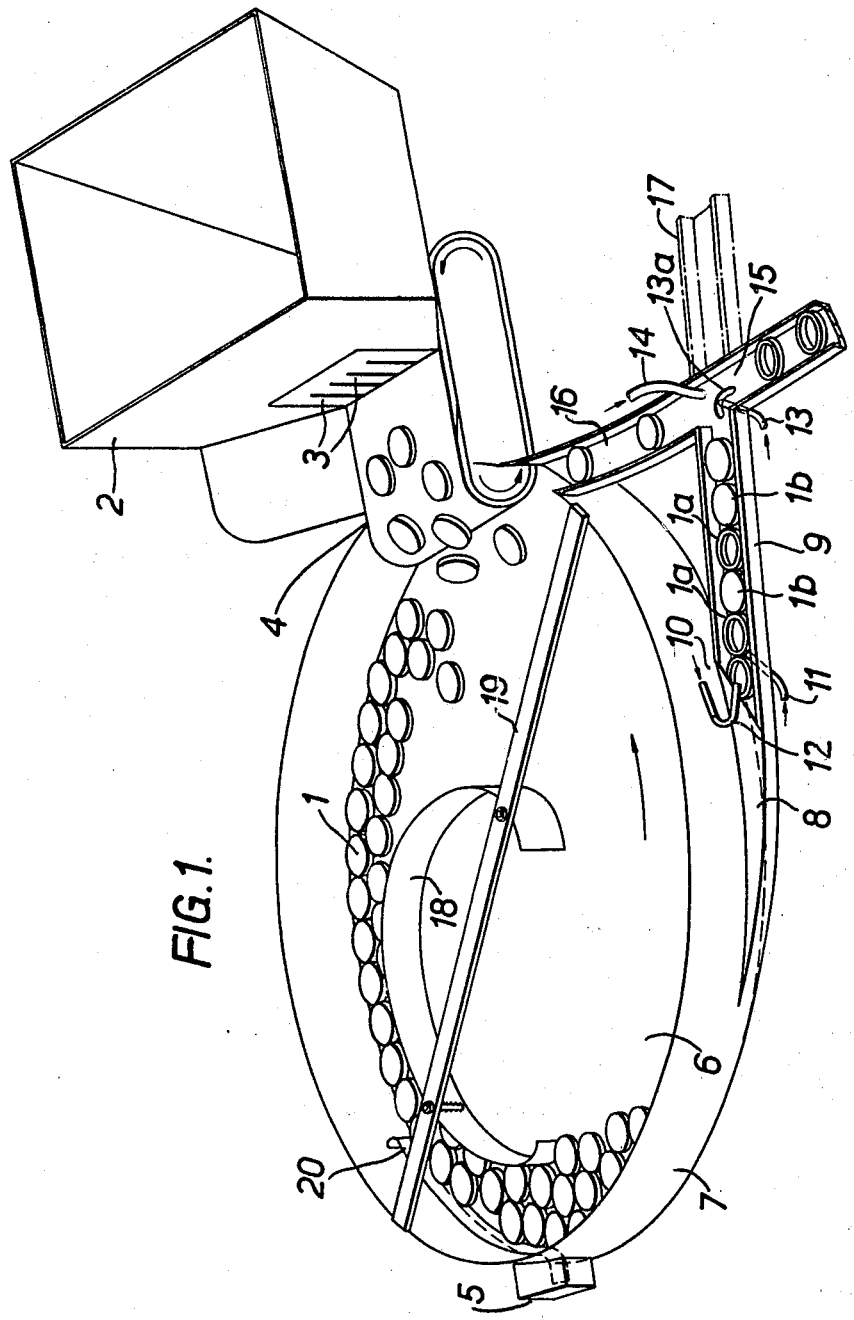

The present invention relates to a method of and apparatus for unscrambling articles in bulk of cup or dish or like form, such as the caps or closures of bottles, jars, cans or other containers. Such articles are hereinafter generically termed "caps." Unscrambling has to occur between a hopper or other supply of the caps in the scrambled (disorderly) bulk and a delivery region where it is required that the caps be fed in succession each in a predetermined orientation. This is necessary for example when the articles have to be fed to capping heads or chucks which apply them to filled containers, e.g. containers filled by suitable machinery.

One known means for separating caps from a bulk and delivering them in the same orientation along a covered chute or passage to the capping head or heads comprises a revolving plate forming a wall or a cavity into which the articles fall, and provided with pins and/or appropriately formed protuberances around its periphery to allow the caps to fall in a desired orientation into a covered chute whilst rejecting those which reach the zone of selection in an incorrect orientation. The articles are subjected however to considerable agitation and impact before finding the position in which they can pass the pins and scuffing or other damage of the caps may occur, especially if the caps have been coated or otherwise produced with a high finish or are of deformable material such as a plastics material, and it is difficult especially with certain types of caps, to obtain the necessary speed of delivery of the orientated caps although if higher delivery speeds could be obtained there would be little or no difficulty in the mechanical capping.

The present invention aims to provide a method and apparatus which will function smoothly and efficiently at speeds of delivery of properly orientated caps which are generally considerably in excess of those hitherto obtainable.

The present invention, according to one feature thereof, comprises apparatus for systematically extracting caps from a scrambled bulk comprising a hopper for the scrambled caps; means for receiving caps therefrom and causing them to travel in inverted and reverse random order as a stream to a selection zone where by means, preferably fluid, e.g. pneumatic, blast or jet means, responsive to the inverted or reverse lie of a cap acted upon thereby in the said stream, separation of the caps is made and at least one stream of correspondingly orientated caps is produced for delivery to a capping apparatus. Whether the cap be inverted or in the reverse lie when it reaches the selection zone a prevailing impelling force, e.g. an air jet or blast may operate on a suitable part of the inside surface of a selected cap and determine the direction in which the cap is displaced from said zone. Two separate streams may be produced, one of caps correspondingly orientated in one sense and the other of caps correspondingly orientated in the opposite sense. Alternatively caps not in a selected orientation may be rejected and fed back for recirculation or to an appropriate receiver.

The caps may be progressively extracted from the hopper on to a rotating platform or table (hereinafter called a "platform") which centrifuges them towards a fixed retaining wall and forms a main stream containing the caps in inverted and reverse random order and leading to a selection zone where separation of the caps is made and at least one stream of correspondingly orientated caps is produced for delivery to a capping apparatus, e.g., in the manner aforesaid. A stream of caps contiguous with the retaining wall may be fed tangentially through an outlet along a passage or chute (which may be tangential to the platform), in inverted and in reverse lie in random order, although it is also permissible to locate the selection zone directly in the vicinity of the platform and to separate off a branch stream from the caps travelling as a stream in random inverted and reverse order against the retaining wall.

The caps may be progressively extracted by any suitable means, e.g., means operating within the hopper, but as is hereinafter described they may be extracted from the hopper by means of an endless belt or conveyor acting under a bottom opening in the hopper, through an outlet in the lower region of the hopper, e.g., in one side thereof. The outlet may be covered by a resilient, e.g. rubber, curtain, e.g., formed by multiple tongues or flaps which can flex upwardly to allow the caps to pass and which as a group normally cover the opening until the driving power of the belt prevails.

The caps may drop off one end of the upper reach of the belt on to the rotating platform which centrifuges them so that caps will collect in the outer marginal region of the platform. The delivery rate from the hopper may be chosen so that the caps do not excessively pile up on the platform but by suitable deflecting means and/or by suitably proportioning the outlet from the platform it can be ensured that the caps reach the selecting zone without an overlying cap interfering with the selecting operation.

Two or more concentric series of caps may be produced in the marginal region of the platform and carried round to the tangential outlet so that only the outer series will enter the outlet. The chute may be designed to accommodate caps of different diameter, or where necessary adjustable or interchangeable chutes or passages may be provided, and chutes or passages for separated streams of caps may also be likewise formed. The action of the rotating platform will tend to bring the caps into either the upright or inverted position although if a cap should arrive at the tangential outlet on edge the nature of the outlet will prohibit its entry and it will be deflected back on to the platform to travel again round therewith and eventually reach the outlet in the flat lie. An overlying cap, or caps, may be deflected back on to the platform by the same, or other suitable, means. At the rear edge of the outlet in the direction of rotation of the platform the caps of the inner series, or next inner series to that passing through the outlet, may be deflected away from the outlet to travel on with the platform and this can be achieved without damaging impact of the caps by providing the rear edge of the outlet with an edging of rubber or other resilient buffering material. An initial selection is thus achieved and it can be ensured that all caps entering the chute or passage from the outlet aforesaid will be either in the inverted or reverse position.

All the caps in a stream separated from the main stream and directed to a capping head may be either inverted or upright and if necessary they may be reversed as to orientation, e.g. by spiralising the chute or passage along which they pass to the capping head.

At the separating zone at least two air jets may be provided, so arranged and directed at such an angle that if, for example, a cap arrives at this zone in inverted position one jet will act on the inside of the skirt of that cap at a predetermined position and deliver a motivating force thereto at such a position as to direct that cap into the secondary stream to the capping head while the other jet will impinge on the outer surface, preferably on the crown, of the cap in question so that it will exert insufficient motivating force on the cap to prevent the first mentioned jet from prevailing.

The other jet will however exercise a motivating force on a cap arriving at the separation zone in the reverse lie by acting on the inside thereof, this jet then prevailing over the first jet acting now on the outside surface of the said cap.

Two jets, or opposing jets, are not always necessary, e.g., a single jet, or two or more jets, may operate on the inside of the cap to be directed into the stream to the capping head in which case the tendency of said jet or jets to displace a cap which lies in the reverse position into the said stream may be countered otherwise than by the force of an opposing jet, e.g., by forming the chute or passage with a laterally inclined base, or where the caps are ejected directly off the platform as a stream in the right orientation, by arranging the platform in a slightly inclined position to the horizontal, so that the force of the jet, or jets, when acting on the inside of the cap is sufficient to overcome the force of gravity, but when acting on the outer surface of the cap is insufficient to overcome such force.

Two or more jets may operate to displace the caps in the stream towards the capping head, e.g. so that when the cap is moved on out of the effective reach of the one, the other, or others, will be effective.

The arrangement may be such that when the belt is stationary, the outlet of the hopper will be closed by the aforesaid curtain but as soon as the belt commences to move caps are carried forward and dropped on to the rotating platform in a continuous and even flow.

Provision may be made for periodically or intermittently stopping extraction of caps from the hopper, e.g., switch means may be provided responsive to the quantity of caps on the platform to cut out the drive of the aforesaid belt whenever an excess of caps reaches the platform or a congestion arises. For example, the platform may be formed with a convergent channel or passage between the belt and the outlet designed to canalise the caps travelling round with the platform and the aforesaid switch may be controlled by a hinged lever which may be of a rigid or flexible character and is displaceable by the caps if the channel becomes overfilled or congested so as to open the switch and cut out the motor driving the belt. The lever may be so constructed or controlled that when the congestion in the channel eases the lever will automatically release the switch and cause the motor to restart. The switch may be operated by air flow under pressure, obturated or not by the lever, but various ways are available of operating the switch under the control of the lever.

Provision may also be made for assisting the travel of the caps in the tangential chute or passage and a convenient means to this end is an air or other fluid jet or jets. Two or more jets may be directed to act on the inside of the skirts of the caps, irrespective of whether the cap is inverted or uninverted, in a direction to impel the caps along the said chute or passage.

In order that the invention may be the more readily understood, reference is hereinafter made to the accompanying drawings which diagrammatically illustrate embodiments of apparatus according to the invention by way of example.

Figure 2:
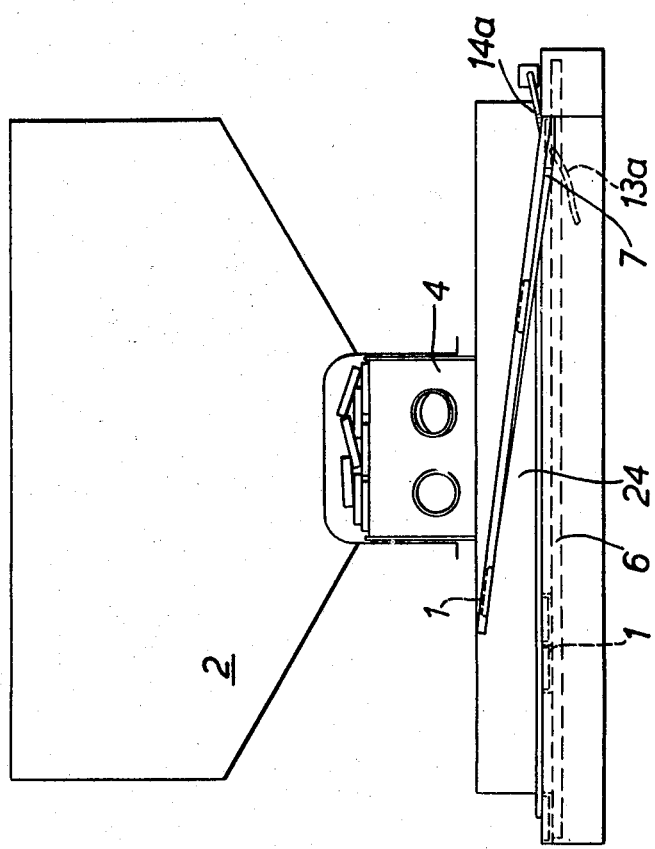
Figure 3:
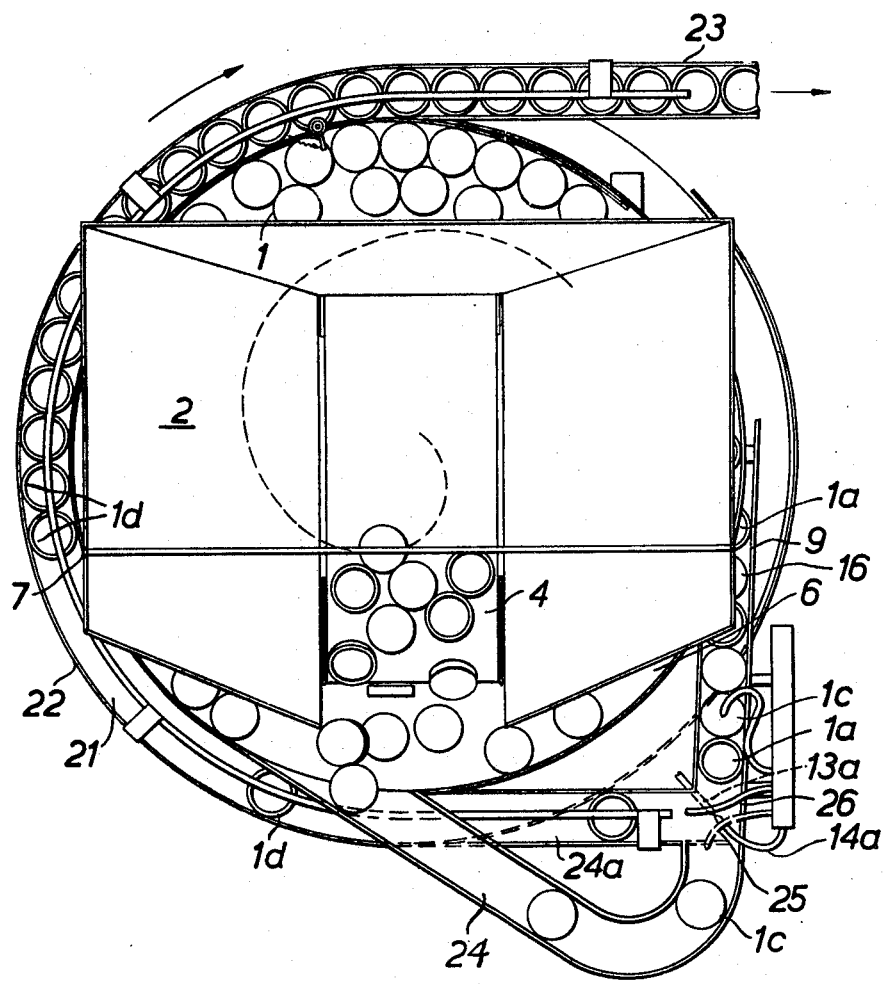

FIG. 1 is a perspective view of one embodiment, and FIGS. 2 and 3 are side elevational and plan views respectively of another embodiment.

The caps 1 are contained in scrambled or disorderly bulk in a hopper 2 having an outlet covered by a series of resilient flaps 3 which can hinge upwards to allow caps to escape from the outlet. The upper reach of an endless belt 4 lies under a bottom opening in the hopper and caps are carried along by the belt past the flaps at a rate determined by the speed of the belt. The belt is driven by a geared motor (not shown) which can be stopped and started by a switch 5 as is hereinafter described.

The apparatus comprises a platform 6 rotatable about a central axis, e.g., having a spindle or journal rotatably supported in a bearing below the platform, and the upper surface of the platform is preferably made as smooth as possible so as to lessen the risk of scratching or marking the caps, although if desired the platform may have vanes or the like other suitable means to assist the outward throw of the caps. The belt delivers the caps on to the platform which continuously rotates and centrifuges the caps against a fixed retaining wall 7 having an outlet 8 through which caps are tangentially delivered to a chute or passage 9 which may be covered. If in the region of the outlet two or more concentric series of caps are present, only the caps in the outer series are delivered into the chute or passage and those of the inner series may be deflected by the rear edge of the outlet so as to continue rotating with the platform. This edge 10 may be provided with a rubber or other resilient buffer to avoid damaging impact of the caps with a hard edge. The motion of the platform tends to maintain the caps in or to bring them into the flat position on the platform, but if a cap is standing on its edge in the outer series it will not pass through the gate (the depth of which is suitably proportioned for this purpose) but will be deflected inwards to continue round with the platform until it eventually falls flat.

Thus in the passage or chute 9 the caps will all be flat but in random inverted and reverse orientation, forming a main stream in the chute. The propulsion of the caps along the chute or passage may be assisted by air jets 11 and 12 or by sloping the chute or passage or in any other suitable manner.

In the form illustrated the caps in the main stream arrive at a T-junction where provision is made for separating the inverted caps from the uninverted caps. At least two nozzles are provided, viz., 13 and 14. The nozzle 13 will deliver a jet of air through an appropriately situated slot or opening 13a in the base of the chute or passage at the junction, i.e., on to a cap from below and the other nozzle 14 will deliver a jet from above. The nozzles are appropriately disposed or angled so that if a cap arrives at the junction in the inverted position, such as the caps 1a, the jet from the nozzle 14 will be directed against an appropriate part of the inside of the skirt of that cap to impel it along the branch chute or passage 15, the other jet 13 then merely impinging on the outside of the crown of that cap so that the force of the first jet will prevail. If, on the other hand, the caps in the main stream are not inverted, see 1b, then the jet from the nozzle 13 will act on the inside of the skirt of that cap and impel it along the branch passage 16 while the jet from nozzle 14 will merely impinge on the crown of that cap and have insufficient impelling force to prevent the first jet from prevailing. Thus one secondary stream of caps will pass down the chute or passage 15 to the capping machine. This chute or passage may spiralize so that the caps will be presented the right way up for capping, or alternatively, the jets may be disposed so that all the caps in the stream passing to the capping machine will be in the uninverted position. In the case illustrated the uninverted caps 1b may be impelled up the branch chute or passage 16 and caused to fall on to the platform.

The jets may be disposed so that the caps in one orientation will be impelled along a branch chute or passage and those of the opposite orientation will be caused to continue in the general direction of the main stream as indicated by the dotted lines 17. Or the rejected caps may be carried back to the hopper or to any convenient reservoir.

The branch chutes or passages are shown at right angles to the main stream, but they may diverge for example like the branches of a Y or in any other suitable manner.

If desired both branch streams may lead to capping heads or be caused to join one another to form one stream to a given capping machine or head if provision is made such as a spiralising portion of the chute or passage for bringing all the caps into the same orientation and for joining the two streams.

A convergent channel is formed on the platform by means of the curved member 18 suitably fixed to the outer fixed retaining wall as by a cross bar 19. A lever 20 hinged to the retaining wall 7 or in other suitable position, is co-operative with the switch 5 beforementioned. If this channel becomes overfilled or congested with caps, the caps push the lever outwards to actuate the switch and cut out the motor driving the belt 4. As soon as the channel clears sufficiently, the lever which is loaded to spring inwards, causes the motor to be switched in again to restart the belt.

It will be noted that the covers (which may be transparent) for the chutes are not shown in the illustration.

The pneumatic jet selection of the caps is simple in operation and the jets may be in continuous operation and have little or no damaging action on the caps and in combination with the centrifuging action of the rotating platform promotes a highly efficient separation and a high speed of delivery of correctly orientated caps to the capping head. Means other than a rotating platform are however envisaged of leading a stream of inverted and uninverted caps to the selecting zone, e.g., the caps may be formed into a main stream by a system of pneumatic jets or a spiral runway.

The centrifuging system may moreover be advantageous with other than pneumatic selecting means, e.g., soft-bristle brush or other suitable deflectors may be used, e.g., continuously rotating, appropriately arranged to have a similar action to the jets in separating caps at the separation zone.

Provision such as fluid jet means may be made for detecting and ejecting any incorrectly orientated cap in the divided off stream to the capping head.

The platform may be covered and if desired the depth of the covered chamber then formed may preclude the caps from being carried round by the platform in otherwise than the flat position, suitable entry means being provided for the caps to the platform.

The apparatus herein described can be arranged in any appropriate relation to the capping machine and if desired located above that machine so that the desired stream of correctly orientated caps will descend down the chute to the capping head or heads.

The apparatus, see the embodiment shown in FIGS. 2 and 3, may be constructed to direct an operative stream of caps from the separating zone and all in the same orientation onto a marginal zone 21 of the platform on the outer side of the fixed retaining wall 7 against which caps within the said wall are centrifuged before reaching the separating zone. This can be readily achieved by making the platform to extend peripherally under and beyond the retaining wall 7 and with the aid of a further fixed outer circumferential retaining wall 22 forming a channel with the marginal zone 21 of the platform as its base. Thus a reservoir of caps 1d, all in the same orientation can be formed around the margin of the platform in the channel, preferably around the major part of the circumferential extent of the platform, and delivered tangentially from the platform to pass by way of a suitable passage 23 to the capping zone. Thus a correctly orientated stream of caps is always available whenever the platform is set in operation.

Those caps 1c which have been directed from the separating zone in the opposite orientation may be fed off as a separate stream advantageously up to an inclined track 24, which may bridge a tangential track 24a from the separating zone to the margin of the platform, and from which they are returned to the platform within the inner retaining wall.

The caps may be delivered from the outer series on the margin of the platform and by way of passage 23 into a track which extends vertically or at a suitable angle upwards and then turns in such a direction that the orientation of the caps will be reversed. Thus if the caps are inverted as shown in the operative stream they will be reversed in the upper part of the track and may thus be led to the capping machine in a position ready for capping.

One or more jets 25 may be provided to assist the caps to travel up the said track. These could be in the base of the track. They may fall from the delivery end thereof onto the platform within the inner retaining wall. One or more jets 26 may be provided to assist the flow of the other series of caps.

In the illustrated embodiment, FIGS. 2 and 3, the jet 13a opening through the bottom of the track will act on the inside of caps 1c and jets 14a will act on the insides of the caps 1d.

The marginal series of caps merely rest on the margin of the platform so that they can be carried round with the platform while permitting any necessary slip between the platform and the caps.

The various tracks may be suitably covered and the covers may be transparent or translucent for inspection purposes. The covers may be removable to permit access to the caps in the tracks.

What I claim is:
1. Apparatus for systematically extracting caps from a scrambled bulk comprising:
   a platform,
   a retaining wall,
   means for rotating said platform at a speed sufficient to impel caps on said platform by centrifugal action against the inside of said retaining wall,
   outlet guide means connected to said wall through which caps can be discharged from said rotating platform, said wall adapted to prevent caps from moving off the edge of said platform prior to arriving at said outlet guide means,
   first and second branch guide means in communication with said outlet guide means,
   selecting means adjacent said outlet guide means, said rotating platform adapted to deliver caps to said selecting means randomly in a first predetermined orientation and a second predetermined orientation different from said first orientation, said selecting means comprising,
   first fluid jet means positioned adjacent to said outlet guide means in order to direct caps of said first orientation along said first branch guide means, and
   second fluid jet means positioned adjacent to said outlet guide means opposite said first jet means in order to direct caps of said second orientation along said second branch guide means.
2. The apparatus of claim 1 in which each of said fluid jet means operates respectively on the inside of caps of said first and second orientation in order to direct said caps along said first and second branch means.

3. The apparatus of claim 1 in which:
said retaining wall comprises a fixed wall having an opening to said outlet guide means,
said outlet guide means comprises a tangential guideway for caps delivered from said platform, and
each of said fluid jet means is positioned at the zone of intersection of said first and second branch guide means with said tangential guideway.

4. The apparatus of claim 3 in which at least one air jet nozzle is located adjacent the entrance end of said tangential guideway in order to assist in propelling the caps along said guideway to said selecting means.

5. The apparatus of claim 1 having:
an endless conveyor belt under a bottom opening of a hopper for conveying scrambled caps past a gated aperture onto said rotating platform,
means providing a movable track for the caps on the rotating platform within said retaining wall, said track comprising a yielding wall within said retaining wall which is displaceable by congested caps on the track, and
switch means operable by said yielding wall when the caps become congested in said track to stop the conveyance of unscrambled caps onto the platform.

6. The apparatus of claim 1, including:
an annular channel round the retaining wall, the base of which is formed by the marginal region of the platform,
said outlet guide means comprising a tangential guideway for the stream of caps delivered off the platform,
said first branch guide means branching from said tangential guideway to the platform,
said second branch guide means branching from said tangential guideway to the channel,
said selecting means being positioned at the junction of said first and second branch guide means with the tangential guideway, the selecting means being operative to direct caps of said first orientation into the said channel and caps of said second orientation back onto the platform.

References Cited

UNITED STATES PATENTS

| | | | |
|---|---|---|---|
| 2,744,612 | 5/1956 | Kay et al. | 198—33 |
| 2,904,162 | 9/1959 | Simer | 198—33 |
| 3,012,651 | 12/1961 | Hawkes | 198—33 |
| 3,065,841 | 11/1962 | Stover | 198—33 X |
| 3,161,274 | 12/1964 | Lanz. | |
| 3,165,194 | 1/1965 | Madden | 198—33 |
| 3,285,387 | 11/1966 | Ochs | 198—33 |
| 3,300,022 | 1/1967 | Sterling | 198—33 |

EVON C. BLUNK, *Primary Examiner.*

EDWARD A. SROKA, *Examiner.*

M. L. AJEMAN, *Assistant Examiner.*